United States Patent
Soto

(10) Patent No.: US 10,150,358 B2
(45) Date of Patent: Dec. 11, 2018

(54) GENERATOR AND ELECTRICAL MOTOR FOR MULTI-AXLE VEHICLES

(71) Applicant: Erik Orlando Soto, Miami, FL (US)

(72) Inventor: Erik Orlando Soto, Miami, FL (US)

( * ) Notice: Subject to any disclaimer, the term of this patent is extended or adjusted under 35 U.S.C. 154(b) by 0 days.

(21) Appl. No.: 15/380,252

(22) Filed: Dec. 15, 2016

(65) Prior Publication Data

US 2017/0174067 A1 Jun. 22, 2017

Related U.S. Application Data

(60) Provisional application No. 62/268,633, filed on Dec. 17, 2015.

(51) Int. Cl.
*B60K 6/40* (2007.10)
*B60K 6/26* (2007.10)
(Continued)

(52) U.S. Cl.
CPC .................. *B60K 6/26* (2013.01); *B60K 6/24* (2013.01); *B60K 6/28* (2013.01); *B60K 6/40* (2013.01); *B60K 6/48* (2013.01); *B60K 15/10* (2013.01); *B60L 7/10* (2013.01); *B60L 11/14* (2013.01); *B60L 11/1864* (2013.01); *B60L 11/1877* (2013.01); *B60L 2200/28* (2013.01); *B60L 2200/36* (2013.01); *B60L 2220/42* (2013.01); *B60Y 2200/148* (2013.01); *B60Y 2200/92* (2013.01); *Y02T 10/646* (2013.01);
(Continued)

(58) Field of Classification Search
CPC ... B60K 6/24; B60K 6/28; B60K 6/40; B60K 6/48; B60K 2001/0444; B60L 11/1809; B60L 7/10; B60Y 2200/148; B60Y 2200/92

See application file for complete search history.

(56) References Cited

U.S. PATENT DOCUMENTS

| 2,329,099 | A | * | 9/1943 | Burger | B62D 59/00 |
| | | | | | 180/53.6 |
| 5,178,403 | A | * | 1/1993 | Kemner | B61D 49/00 |
| | | | | | 180/165 |

(Continued)

FOREIGN PATENT DOCUMENTS

JP 2012126304 A * 7/2012

*Primary Examiner* — James A Shriver, II
*Assistant Examiner* — Steve Clemmons
(74) *Attorney, Agent, or Firm* — Mark Terry

(57) ABSTRACT

The generator and electrical motor system for multi-axle vehicles uses a generator to power electric motors which propel a multi-axle vehicle. The system includes a hybrid powertrain, a primary battery bank, and a primary generator. The hybrid powertrain uses electric motors to provide the drive power for the vehicle. To that end, the hybrid powertrain has a drive axle, an electric motor, a powertrain battery, and a power management unit. The drive axle is rotated by the electric motor and rotates the wheels of a vehicle. The primary battery bank and the powertrain battery are rechargeable electrical energy storage devices that store the power supplied by the generator. Additionally, the primary battery bank and the powertrain battery supply electrical power to the electric motor. Finally, the power management unit is a power conditioning system that regulates current and voltage being distributed to the electrical components of the system.

20 Claims, 4 Drawing Sheets

(51) Int. Cl.
*B60K 6/48* (2007.10)
*B60K 6/24* (2007.10)
*B60K 6/28* (2007.10)
*B60K 15/10* (2006.01)
*B60L 7/10* (2006.01)
*B60L 11/14* (2006.01)
*B60L 11/18* (2006.01)

(52) U.S. Cl.
CPC ............ *Y02T 10/70* (2013.01); *Y02T 10/7005* (2013.01); *Y02T 10/7061* (2013.01); *Y02T 10/7077* (2013.01); *Y10S 903/905* (2013.01); *Y10S 903/906* (2013.01); *Y10S 903/907* (2013.01); *Y10S 903/951* (2013.01)

(56) References Cited

U.S. PATENT DOCUMENTS

| | | | | |
|---|---|---|---|---|
| 6,886,647 | B1 * | 5/2005 | Gotta | B60K 1/02 180/65.1 |
| 7,147,070 | B2 * | 12/2006 | Leclerc | B60K 1/00 180/14.2 |
| 7,520,354 | B2 * | 4/2009 | Morrow | B60K 6/365 180/271 |
| 8,215,436 | B2 * | 7/2012 | DeGrave | B60L 7/08 180/165 |
| 8,789,472 | B2 * | 7/2014 | Mai | B60L 7/10 105/34.1 |
| 8,875,819 | B2 * | 11/2014 | Muggeo | B60K 6/48 180/65.25 |
| 9,108,691 | B2 * | 8/2015 | Fanourakis | B60W 20/15 |
| 9,566,854 | B2 * | 2/2017 | Kerschl | B60D 1/64 |
| 9,789,756 | B2 * | 10/2017 | Schwartz | B60K 6/28 |
| 2005/0109549 | A1 * | 5/2005 | Morrow | B60K 6/365 180/65.245 |
| 2009/0093336 | A1 * | 4/2009 | Soliman | B60K 6/52 477/5 |
| 2011/0162896 | A1 * | 7/2011 | Gillett | B60K 1/04 180/2.2 |
| 2013/0257145 | A1 * | 10/2013 | Caldeira | B60L 3/0046 307/9.1 |
| 2014/0300182 | A1 * | 10/2014 | James | B60R 16/03 307/10.1 |
| 2016/0221571 | A1 * | 8/2016 | Chen | B60W 10/06 |

* cited by examiner

GENERATOR AND ELECTRICAL MOTOR FOR MULTI-AXLE VEHICLES

The current application claims a priority to the U.S. Provisional Patent application Ser. No. 62/268,633 filed on Dec. 17, 2015.

FIELD OF THE INVENTION

The present invention relates generally to a multi-axle gas electric hybrid vehicle, more particularly to a vehicle with an internal combustion engine and a plurality of axle mounted generators which power an electric motor. A user of the present invention is able to reduce the amount of fuel consumed by a multi-axle vehicle by employing the use of multiple generators to power an electric motor, thereby augmenting the drive power output of the vehicle's powertrain.

BACKGROUND OF THE INVENTION

The use of traditional internal combustion (IC) engine results in pollution and the destruction of the environment. Additionally, while using an internal combustion engine much of the generated energy is lost as heat. Another drawback, to the continued use of ICE vehicles, is that they rely on oil reserves, which are known to be a diminishing resource. However, because of the amount of time and energy spent developing IC engine vehicles, there is a considerable amount of existing infrastructure. This infrastructure gives a vehicle owner the assurance that there will be locations to refuel or repair the vehicle in virtually any country on the planet.

A new trend in automotive technology is the use of electric vehicles (EV). Because these vehicles do not consume fuel, EVs reduce the operating cost for a user. In addition to lowered operating costs, EVs do not produce carbon emissions, and therefore help to reduce the rate of environmental pollution. Despite these benefits, the infrastructure for refueling and repairing EVs does not have significant global penetration. Therefore, when choosing between IC engine vehicles and EVs, a user is often presented with the tradeoff of reliability versus environmental conscientiousness.

The present invention, the generator and electrical motor for multi-axle vehicles, addresses these issues by marrying the benefits of an EV to the reliability of an IC generator. The present invention uses an IC generator to produce the electrical power required to operate the electric motor. By coupling a plurality of generators to the axles of a vehicle, the present invention produces enough energy to charge a battery bank and power an electric motor. Using an onboard computer, the present invention is able to determine when sufficient power is being produced. The present invention then switches off the IC generator and relies on electric power alone. The power stored in the battery bank is used to power the electric motor and any other vehicle systems, such as lights, air conditioners, radios, and the like. Because the present invention employs a plurality of axle-coupled generators, the system can be adapted for use with any multi-axle vehicle, such as trains, cars, tanks, trucks, and the like.

DETAIL DESCRIPTIONS OF THE INVENTION

All illustrations of the drawings are for the purpose of describing selected versions of the present invention and are not intended to limit the scope of the present invention.

Figure 3:
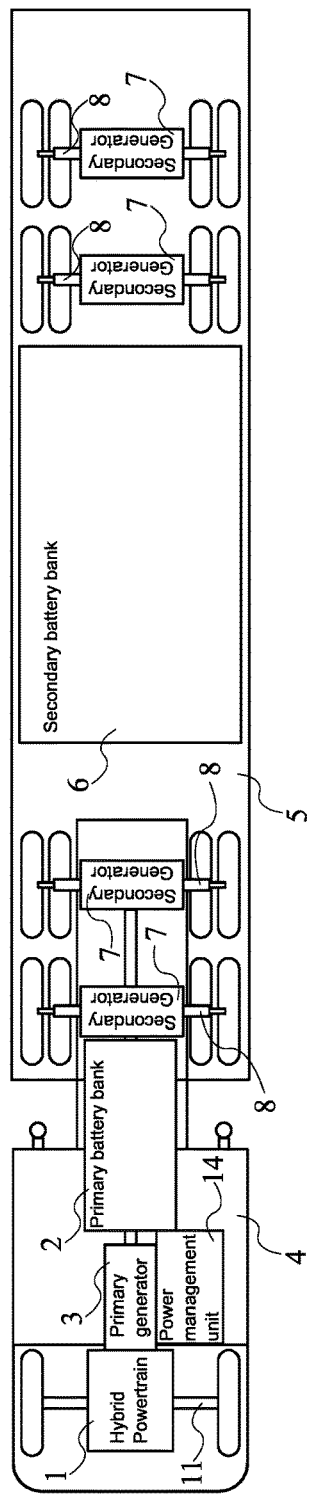
FIG. 3 is a block diagram illustrating the arrangement of components used in one embodiment of the present invention that is integrated into a semi-trailer truck.
Figure 4:
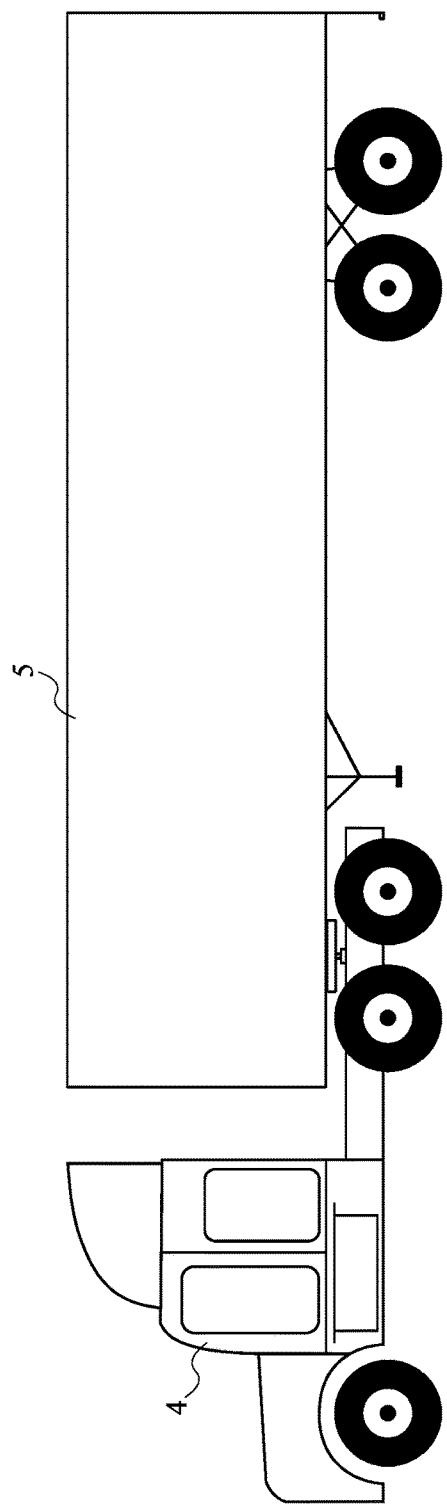
FIG. 4 is a right-side view of a semi-trailer truck equipped with one embodiment of the present invention.

As can be seen in FIG. 3 and FIG. 4, the present invention, the generator and electrical motor for multi-axle vehicles, is a system that makes use of electric motors to provide the drive force required to propel a vehicle with two or more axles. The present invention employs at least one primary generator 3 to provide the initial electrical power required for the electric motors to propel the vehicle. Additionally, an aim of the present invention is to employ at least one secondary generators 7 to convert a portion of the kinetic energy generated by the movement of the vehicle into electrical energy. In this way, the present invention improves upon traditional vehicles.

Figure 1:
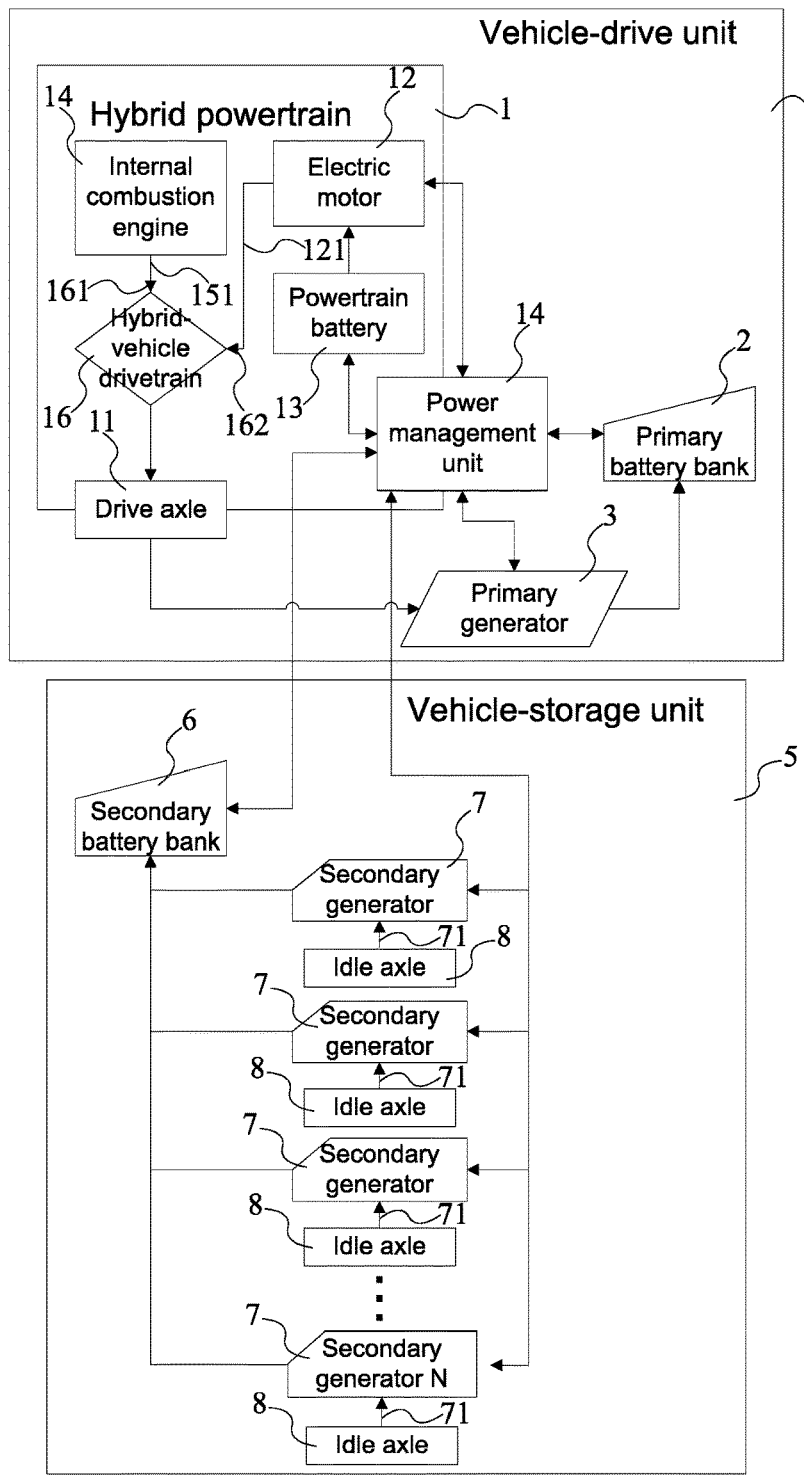
FIG. 1 is a block diagram illustrating the connections between the components of the present invention.
Figure 2:
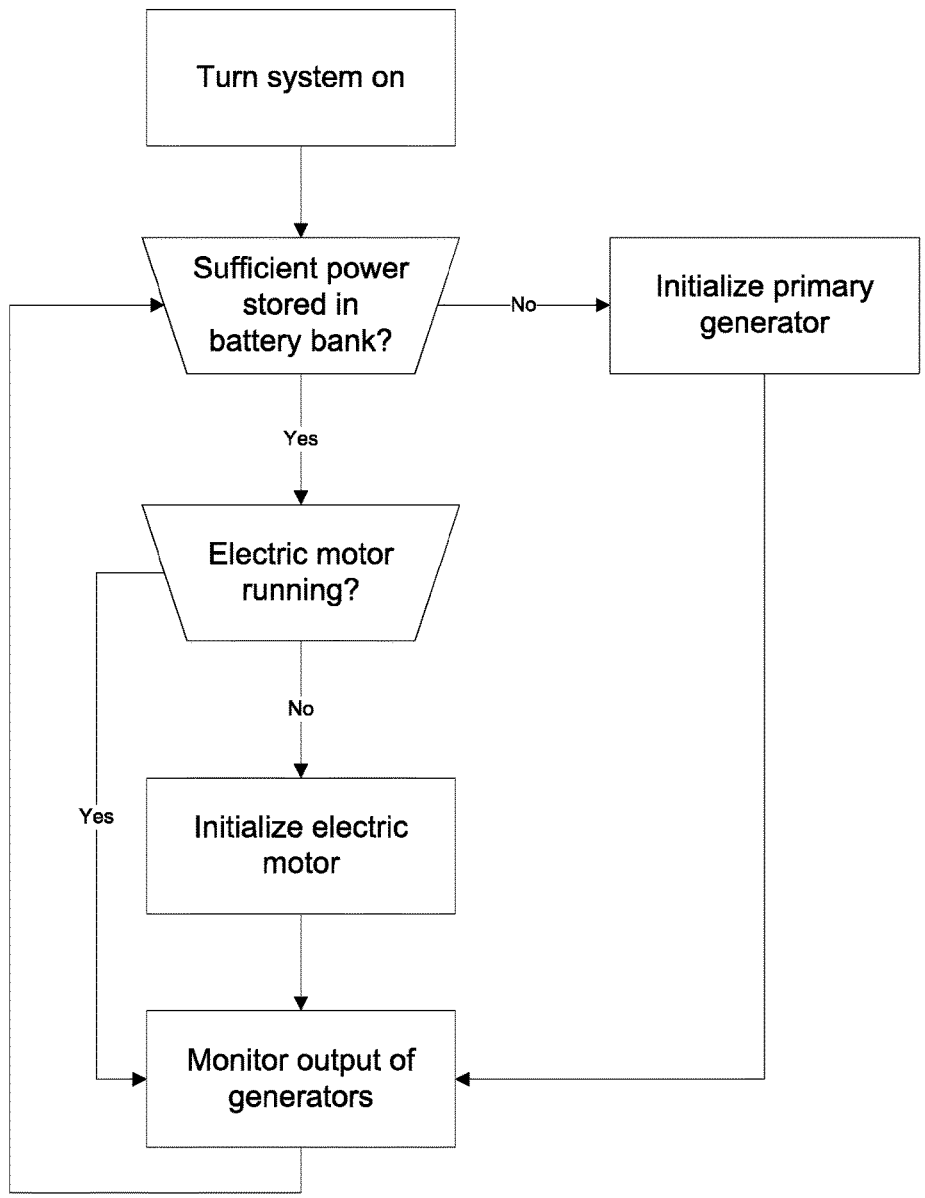
FIG. 2 is a flowchart illustrating the workflow of the power management unit in the present invention.

As can be seen in FIG. 1, FIG. 2, and FIG. 3, the present invention comprises a hybrid powertrain 1, a primary battery bank 2, and a primary generator 3. The hybrid powertrain 1 provides the drive power for the present invention by converting electrical energy into mechanical energy. The hybrid powertrain 1 comprises at least one drive axle 11, at least one electric motor 12, a powertrain battery 13, and a power management unit 14. The at least one drive axle 11 is an axle that is used as the axis about which the wheels of a vehicle rotate. The at least one electric motor 12 is operatively coupled to the at least one drive axle 11, wherein the at least one electric motor 12 is used to rotate the at least one drive axle 11. As a result, the at least one electric motor 12 provides the drive force to the at least one drive axle 11. This drive force is then transferred to the vehicle's wheels by the at least one drive axle 11. The powertrain battery 13 is a rechargeable battery used to provide electrical power to the at least one electric motor 12. Similarly, the primary battery bank 2 is a bank of rechargeable batteries used to store and supply electrical power for the present invention. The powertrain battery 13 functions as a local power source for the hybrid powertrain 1 that enables the at least one electric motor 12 to continue functioning if the primary battery bank 2 becomes disconnected. The primary battery bank 2 and the powertrain battery 13 are electrically connected to the at least one electric motor 12 so that the primary battery bank 2 and the powertrain battery 13 are able to provide the electrical power required to operate the at least one electric motor 12. The primary generator 3 is electrically connected to the primary battery bank 2 and the powertrain battery 13. Consequently, the primary generator 3 is able to charge the primary battery bank 2 and the powertrain battery 13. The power management unit 14 is a power conditioning system that acts as a voltage and current regulator for the electrical components of the present invention. The primary battery bank 2, the powertrain battery 13, the at least one electric motor 12, and the primary generator 3 are electrically connected to the power management unit 14. Thus, the power management unit 14 is used to distribute regulated electrical power from the primary generator 3 to the primary battery bank 2, the powertrain battery 13, and the at least one electric motor 12. Additionally, the primary generator 3 is preferably a compressed natural gas generator.

As can be seen in FIG. 1 and FIG. 3, in a first embodiment of the present invention, the hybrid powertrain 1 further comprises an internal combustion (IC) engine 15 and a hybrid-vehicle drivetrain 16. The hybrid-vehicle drivetrain 16 is a drivetrain system that delivers the drive power supplied by two or more power sources to the drive axle 11. In the first embodiment of the present invention, the IC engine 15 and the at least one electric motor 12 function as the power supplies for the hybrid-vehicle drivetrain 16. As such, an output 151 of the IC engine 15 is torsionally coupled to a first input 161 of the hybrid-vehicle drivetrain 16. Accordingly, the IC engine 15 supplies drive power to the hybrid-vehicle drivetrain 16. Similarly, an output 121 of the at least one electric motor 12 is torsionally coupled to a second input 162 of the hybrid-vehicle drivetrain 16 so that the at least one electric motor 12 is able to function as a second supply of drive power for the hybrid-vehicle drivetrain 16. In this first embodiment, the hybrid-vehicle drivetrain 16 is used to select if one or more of the power supplies will be used to provide drive power to the drive axle 11. Because of this, the hybrid-vehicle drivetrain 16 is able to select the most efficient source of drive power based on environmental conditions. In a second embodiment of the present invention, an input 31 of the primary generator 3 is torsionally connected to the at least one drive axle 11. Consequently, the primary generator 3 is able to convert a portion of the kinetic energy of the drive axle 11 into electrical energy.

As can be seen in FIG. 1 and FIG. 3, the present invention further comprises a vehicle-drive unit 4. The vehicle-drive unit 4 is the portion of a vehicle used to house users as well as the components required to supply the drive power needed to propel the vehicle. As such, the hybrid powertrain 1, the primary battery bank 2, and the primary generator 3 are mounted onto the vehicle-drive unit 4. As a result, the vehicle-drive unit 4 is able to function as the tractor of a semi-trailer truck, or the locomotive of a train.

As can be seen in FIG. 1 and FIG. 3, the present invention further comprises at least one vehicle-storage unit 5 and a secondary battery bank 6. The at least one vehicle-storage unit 5 is an ancillary portion of a vehicle that is detachably connected to the vehicle-drive unit 4 and is used to store cargo. For example, the at least one vehicle-storage unit 5 is able to function as the trailer of a semi-trailer truck or one or more of the cars on a train. The secondary battery bank 6 is a supplementary battery bank that is used to augment the function of the primary battery bank 2. The secondary battery bank 6 is electrically connected to the power management unit 14. Consequently, electrical energy stored within the secondary battery bank 6 can be delivered to the hybrid powertrain 1 through the power management unit 14. Additionally, the secondary battery bank 6 is positioned within the at least one vehicle-storage unit 5. Thus, the secondary battery becomes a piece of cargo that is transported by the at least one vehicle-storage unit 5.

As can be seen in FIG. 1 and FIG. 3, the present invention further comprises at least one secondary generator 7, at least one vehicle-storage unit 5, and at least one idle axle 8. The at least one secondary generator 7 is an electrical generator used to transform kinetic energy into electrical energy. The at least one idle axle 8 is an axle of a vehicle that supports the vehicle, yet does not provide any drive power to propel the vehicle. The at least one idle axle 8 is rotatably mounted to the at least one vehicle-storage unit 5. Accordingly, the at least one vehicle-storage unit 5 rests on the at least one idle axles 8 and can be rolled along a road or rail. An input 71 for each of the at least one secondary generators 7 is torsionally connected to a corresponding axle from the at least one idle axles 8. As a result, the at least one idle axles 8 function as the rotors for the at least one secondary generators 7. In this way, the at least one secondary generator 7 converts the kinetic motion of the at least one vehicle-storage unit 5 into electrical energy. Additionally, the at least one secondary generator 7 is electrically connected to the power management unit 14 so that the electrical power being generated can be transferred to the primary battery bank 2 or the secondary battery bank 6 through the power management unit 14. In the present invention, the at least one secondary generator 7 is preferably a regenerative brake. The regenerative brake is used to convert a portion of the kinetic energy of the vehicle into electrical energy. This conversion takes place while the vehicle is braking.

Although the invention has been explained in relation to its preferred embodiment, it is to be understood that many other possible modifications and variations can be made without departing from the spirit and scope of the invention as hereinafter claimed.

What is claimed is:

1. A system for multi-axle vehicles comprises:
   a hybrid powertrain;
   a primary battery bank;
   a primary generator;
   the hybrid powertrain comprises at least one drive axle, at least one electric motor, a powertrain battery, and a power management unit;
   the at least one electric motor being operatively coupled to the at least one drive axle, wherein the at least one electric motor is used to rotate the at least one drive axle, and the at least one electric motor being operatively coupled to the primary generator, such that the primary generator provides current to operate the at least one electric motor;
   the primary battery bank and the powertrain battery being electrically connected to the at least one electric motor;
   the primary generator being electrically connected to the primary battery bank and the powertrain battery, and the primary battery bank, the powertrain battery, the electric motor, and the primary generator being electrically connected to the power management unit;
   a secondary idle axle;
   a secondary battery bank electrically connected to the power management unit;
   a secondary generator operatively coupled to the secondary idle axle, such that the secondary idle axle turns the secondary generator, which produces a current;
   the secondary generator being electrically connected to the primary battery bank, and the secondary battery bank such that the current produced by secondary generator charges the primary battery bank, and the secondary battery bank;
   the secondary generator being electrically connected to the at least one electric motor;
   wherein the power management unit is configured to detect when the stored charge in the powertrain battery and the primary battery bank reach a predefined threshold, the primary generator is deactivated, and the at least one electric motor operates based on the current from the secondary generator.

2. The system for multi-axle vehicles as claimed in claim 1 comprises:

the hybrid powertrain further comprises an internal combustion (IC) engine and a hybrid-vehicle drivetrain;
an output of the IC engine being torsionally coupled to a first input of the hybrid vehicle drivetrain, and
an output for each of the at least one electric motor being torsionally coupled to a second input of the hybrid-vehicle drivetrain.

3. The system for multi-axle vehicles as claimed in claim 1 comprises:
a vehicle-drive unit, and
the hybrid powertrain, the primary battery bank, and the primary generator being mounted onto the vehicle-drive unit.

4. The system for multi-axle vehicles as claimed in claim 1 comprises:
at least one vehicle-storage unit; and
the secondary battery bank being positioned within the at least one vehicle-storage unit.

5. The system for multi-axle vehicles as claimed in claim 1 comprises:
at least one vehicle-storage unit.

6. The system for multi-axle vehicles as claimed in claim 5, wherein the at least one secondary generator is a regenerative brake.

7. The system for multi-axle vehicles as claimed in claim 1, wherein the primary generator is a compressed natural gas generator.

8. The system for multi-axle vehicles as claimed in claim 1, wherein an input of the primary generator is torsionally connected to the at least one drive axle.

9. A system for multi-axle vehicles comprises:
a hybrid powertrain;
a primary battery bank;
a primary generator;
an internal combustion (IC) engine;
a hybrid-vehicle drivetrain;
the hybrid powertrain comprises at least one drive axle, at least one electric motor, a powertrain battery, and a power management unit;
the at least one electric motor being operatively coupled to the at least one drive axle, wherein the at least one electric motor is used to rotate the at least one drive axle, and the at least one electric motor being operatively coupled to the primary generator, such that the primary generator provides current to operate the at least one electric motor;
the primary battery bank and the powertrain battery being electrically connected to the at least one electric motor;
the primary generator being electrically connected to the primary battery bank and the powertrain battery;
the primary battery bank, the powertrain battery, the electric motor, and the primary generator being electrically connected to the power management unit;
a secondary idle axle;
a secondary battery bank electrically connected to the power management unit;
a secondary generator operatively coupled to the secondary idle axle, such that the secondary idle axle turns the secondary generator, which produces a current;
the secondary generator being electrically connected to the primary battery bank, and the secondary battery bank such that the current produced by secondary generator charges the primary battery bank, and the secondary battery bank;
the secondary generator being electrically connected to the at least one electric motor;

wherein the power management unit is configured to detect when the stored charge in the powertrain battery and the primary battery bank reach a predefined threshold, the primary generator is deactivated, and the at least one electric motor operates based on the current from the secondary generator;
an output of the IC engine being torsionally coupled to a first input of the hybrid vehicle drivetrain, and an output for each of the at least one electric motor being torsionally coupled to a second input of the hybrid-vehicle drivetrain.

10. The system for multi-axle vehicles as claimed in claim 9 comprises:
a vehicle-drive unit, and the hybrid powertrain, the primary battery bank, and the primary generator being mounted onto the vehicle-drive unit.

11. The system for multi-axle vehicles as claimed in claim 9 comprises:
at least one vehicle-storage unit;
and the secondary battery bank being positioned within the at least one vehicle-storage unit.

12. The system for multi-axle vehicles as claimed in claim 9 comprises:
at least one vehicle-storage unit.

13. The system for multi-axle vehicles as claimed in claim 12, wherein the at least one secondary generator is a regenerative brake.

14. The system for multi-axle vehicles as claimed in claim 9, wherein the IC engine is a compressed natural gas engine.

15. The system for multi-axle vehicles as claimed in claim 9, wherein an input of the primary generator is torsionally connected to the at least one drive axle.

16. A system for multi-axle vehicles comprises:
a hybrid powertrain;
a primary battery bank;
a primary generator;
an internal combustion (IC) engine;
a hybrid-vehicle drivetrain;
a vehicle-drive unit;
the hybrid powertrain comprises at least one drive axle, at least one electric motor, a powertrain battery, and a power management unit;
the at least one electric motor being operatively coupled to the at least one drive axle, wherein the at least one electric motor is used to rotate the at least one drive axle, and the at least one electric motor being operatively coupled to the primary generator, such that the primary generator provides current to operate the at least one electric motor;
the primary battery bank and the powertrain battery being electrically connected to the at least one electric motor;
the primary generator being electrically connected to the primary battery bank and the powertrain battery;
the primary battery bank, the powertrain battery, the electric motor, and the primary generator being electrically connected to the power management unit;
an output of the IC engine being torsionally coupled to a first input of the hybrid vehicle drivetrain;
a secondary idle axle;
a secondary battery bank electrically connected to the power management unit;
a secondary generator operatively coupled to the secondary idle axle, such that the secondary idle axle turns the secondary generator, which produces a current;
the secondary generator being electrically connected to the primary battery bank, and the secondary battery bank such that the current produced by secondary generator charges the primary battery bank, and the secondary battery bank;

the secondary generator being electrically connected to the at least one electric motor;

wherein the power management unit is configured to detect when the stored charge in the powertrain battery and the primary battery bank reach a predefined threshold, the primary generator is deactivated, and the at least one electric motor operates based on the current from the secondary generator;

an output for each of the at least one electric motor being torsionally coupled to a second input of the hybrid-vehicle drivetrain, and the hybrid powertrain, the primary battery bank, and the primary generator being mounted onto the vehicle-drive unit.

17. The generator and electrical motor for multi-axle vehicles as claimed in claim 16 comprises:

a vehicle-drive unit, and the hybrid powertrain, the primary battery bank, and the primary generator being mounted onto the vehicle-drive unit.

18. The system for multi-axle vehicles as claimed in claim 16 comprises:

at least one vehicle-storage unit;

and the secondary battery bank being positioned within the at least one vehicle-storage unit.

19. The system for multi-axle vehicles as claimed in claim 16 comprises:

at least one vehicle-storage unit.

20. The system for multi-axle vehicles as claimed in claim 16, wherein the IC engine is a compressed natural gas engine.

* * * * *